United States Patent
Brany

[15] 3,667,168
[45] June 6, 1972

[54] MANUFACTURE OF BEARING BALLS

[72] Inventor: Jaroslav Brany, Praha, Czechoslovakia

[73] Assignee: Vyzkumny ustav strojirenske technologie a ekonomiky, Praha, Czechoslovakia

[22] Filed: Feb. 26, 1970

[21] Appl. No.: 14,520

[30] Foreign Application Priority Data

Feb. 28, 1969 Czechoslovakia.....................1503/69

[52] U.S. Cl.................................................51/289
[51] Int. Cl.................................................B24b 1/00
[58] Field of Search......................................51/289

[56] References Cited

UNITED STATES PATENTS

| | | |
|---|---|---|
| 3,104,502 | 9/1963 | Burch................................51/289 X |
| 3,133,382 | 5/1964 | Messerschmidt....................51/289 X |
| 2,964,886 | 12/1960 | Messerschmidt....................51/289 X |
| 1,131,611 | 3/1915 | Newman............................51/289 UX |
| 1,020,803 | 3/1912 | Crecelius...........................51/289 UX |
| 976,875 | 11/1910 | Hayden.............................51/289 UX |

*Primary Examiner*—Harold D. Whitehead
*Attorney*—Richard Low and Murray Schaffer

[57] ABSTRACT

The method and apparatus for machining bearing balls comprising the steps of locating the balls between two opposed working surfaces rotating one of the bodies about an axis, and driving the other body in plane angular thereto and tangentially of the ball to create a rolling of the ball resulting from two independent component axes of force created by the interaction of the two bodies.

9 Claims, 8 Drawing Figures

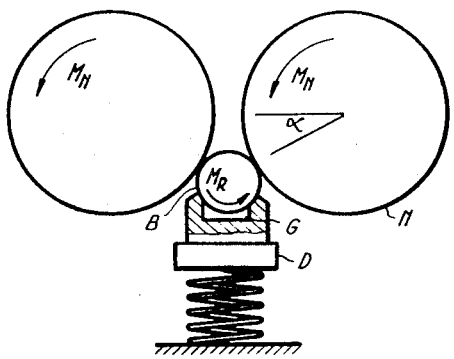
Fig. 1.
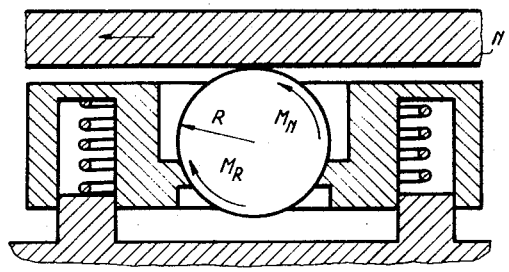
Fig. 2.
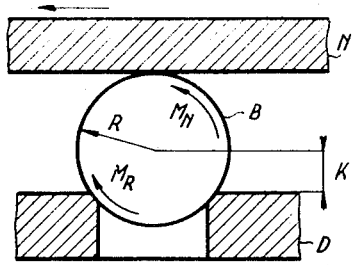
Fig. 3.
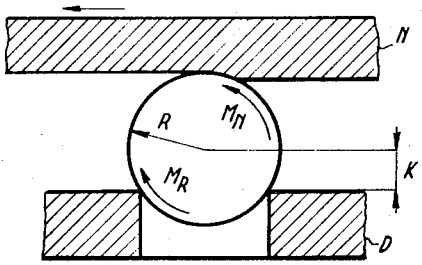
Fig. 4.
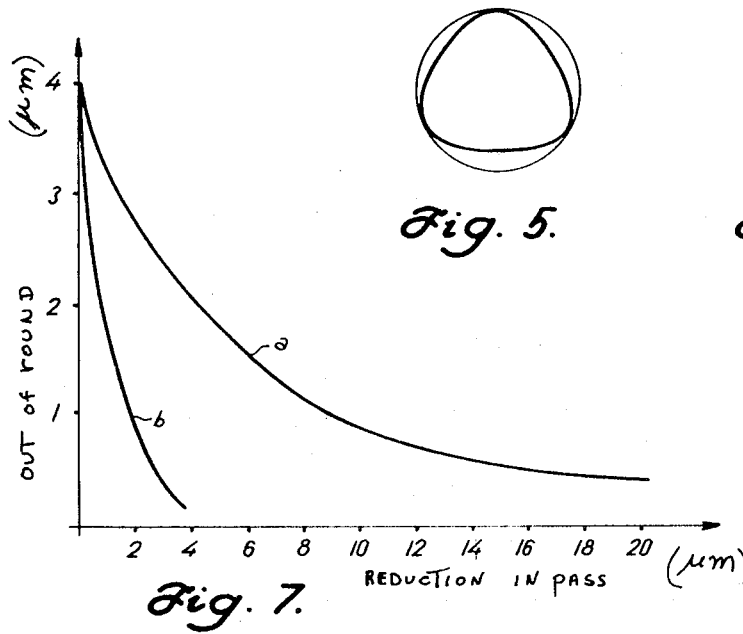
Fig. 5.   Fig. 6.
Fig. 7.
JAROSLAV BRANY
INVENTOR
BY
ATTORNEY

൩,667,168

MANUFACTURE OF BEARING BALLS

BACKGROUND OF THE INVENTION

The present invention relates to a method machining and finishing bearing balls.

Known methods of working bearing balls attempt to obtain uniform finishing by rolling the ball between two similar grinding disks which are generally rotated about or orbital to their central axes. As a result, during each pass of the ball about the grinding surfaces, a strip or belt is machined on the surface. The ball is worked through a number of passes during which time it is assumed that the ball rolls about a sufficient number of random axes so that it is machined over its entire surface.

The change in rolling axes is generally left to chance; however, in my copending application, Ser. No. 760,192, filed Sept. 17, 1968, now U.S. Pat. No. 3,545,139 issued Dec. 8, 1970 there is disclosed an improved method and apparatus for rolling the ball over a regularly changing plurality of meridian paths.

Raw bearing balls deviate from a true sphere and have in fact oval or angular shapes. It has been found that the grinding of raw balls takes considerable time with the known devices and, in fact, results also in the grinding of portions of the surface which do not require grinding to obtain the spherical shape. As a consequence, material, time, and labor are expended to obtain satisfactorily finished balls.

It is an object of the present invention to provide an improved method machining bearing balls.

It is another object of the present invention to provide a simple, efficient, and economical method effectively finishing bearing balls.

It is another object of the present invention to provide a method which reduces the time and material wasted in finishing bearing balls.

It is a more specific object of the present invention to provide a method obtaining controlled finishing over the entire surface of the bearing ball.

SUMMARY OF THE INVENTION

According to the present invention, the novel method comprises the steps of locating the balls between two opposed working surfaces rotating one of the bodies about an axis, and driving the other body in plane angular thereto and tangentially of the ball to create a rolling of the ball resulting from two independent component axes of force created by the interaction of the two bodies.

Preferably, certain variable factors may be selectively controlled. The two bodies may be periodically interrupted, or removed from each other, or their direction reversed or their speed adjusted, so that as a result, the relative components of force will change.

The apparatus comprises a grinding disk mounted for movement about an axis and having a groove for retaining the ball, a drive element mounted above the disk in tangential contact with the ball. Motor means are provided for rotating the disk and displacing the drive element to effect angularly directed components of force on the ball.

Various control means to move the disk relative to the drive element and to interrupt the engagement of the balls between the disk and drive element as well as to control speed and direction of movement are also provided.

A full and detailed disclosure follows herein, as well as illustrations of the advantages and objects of the present invention.

BRIEF DESCRIPTION OF THE DRAWINGS

In the following description, reference is made to the accompanying drawings wherein:

FIG. 1 through FIG. 4 schematically illustrate the method of the present invention in connection with four different forms of structural embodiment;

FIGS. 5 and 6 show the deviate shape of raw balls;

FIG. 7 is a graphic illustration of the beneficial results of the present invention as compared with results obtained by prior art processes;

DESCRIPTION

Figure 8:
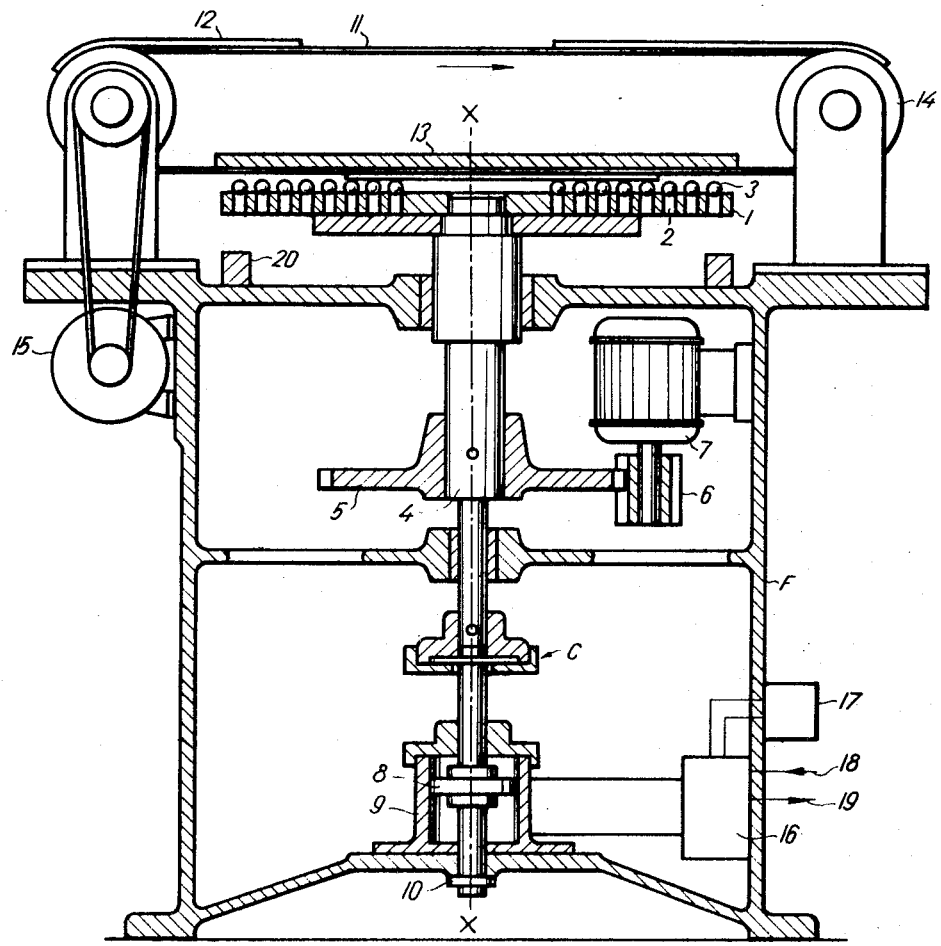
FIG. 8 is an elevational view of the preferred form of apparatus for carrying out the present invention.

The method of the present invention is schematically illustrated in FIGS. 1–4 where a bearing ball B is shown located in a groove or recess G of a rotating body D. Mounted above and spaced from the body D in contact with the seated ball B are one or more driving elements or bodies N. The rotating body D is adapted to retain the ball and to revolve it about a fixed central axis gyrating or displacing the ball in a circular path about the same axis. The drive elements N are adapted to exert a tangential force on the ball in a direction angular to the axis of gyration. It is preferred that the elements N exert their force in a direction generally perpendicular to the axis of gyration as seen in FIGS. 2–4.

Since FIGS. 1–4 are schematic, the various structural details are omitted. It will be obvious to those skilled in this art that conventional mountings, drives, locating feeds and other necessary means may be provided. Reference is made to the description following herein relating to FIG. 8 for one such detailed embodiment.

The rotation of the rotating body D tends to force the ball B to rotate about a first axis resulting from the frictional moment $M_R$ caused by the contact of the ball with the sides of the groove seat G and with the face of the elements N. The simultaneous movement of the element N in a direction angular to the axis of gyration creates a shearing or tangential moment $M_N$ on the surface of the ball tending to cause the ball to rotate about a second axis.

The resultant rotation of the ball B as a function of the two independent and separate axes is in addition to the gyration about the axis of rotation of the body D and therefore produces an efficient, precise and continuous random rolling of the ball permitting the grinding of the ball in a uniform manner over its entire outer surface.

As seen in FIGS. 1 and 2, the body D is spring-loaded to be resiliently urged upwards to maintain the desired frictional engagement of the ball against both groove and drive elements N. In FIG. 3, the body is not spring-loaded; however, as will be noted later, the drive elements N are formed of material having a sufficient coefficient of friction as to maintain the desired contact. In FIG. 4, the element N is provided with one or more resilient pads of foam or sheet plastic or rubber for increased frictional engagement. In FIG. 4, the resilient pad is adapted to engage a wider portion of the surface of the ball than a tangent point; however, the force exerted on the ball remains in effect a shearing or tangential force.

By varying any one of a number of factors in the above process, an even more efficient and effective operation can be obtained since such variations will produce a change in the angular relationship between the first and second rotating axes. Such variations may be effected by controlling the speed of either the body D or the elements N; the direction of rotation of the body D and/or the direction of movement of the elements N (in fact, the components may be completely reversed); and also the pressure at which the ball is maintained between the two bodies.

It has been found that a very effective and simple method of obtaining a change in more than one variable at a time is by interrupting the tangential force applied to the ball. The tangential force applied by the drive elements N may be interrupted by moving the elements N or the body D away from each other during rotation of the body R. When this is done, the ball seated in the groove G moves angularly about the axis of gyration but does not rotate about either of the first and second axes. However when contact is again made with the elements N, the relative position of the ball with the element has changed and the resultant axes of rotation consequently are different. The ball is always placed into motion at a different point and with a different displacement than when it was interrupted.

Interruption can also be obtained by modifying the surface of the drive element N. For example, the resilient pads employed in FIG. 4 may be replaced by a plurality of pads spaced one from each other, so that as the elements N travel linearly over the ball, the ball is intermittently engaged by successive pad surfaces. The pads may in this instance have the same coefficient of friction although it is possible to now provide pads of different material to obtain even greater variation.

This interruption step has certain added advantages in that non-spherical balls will be easier to engage by successive periods of interruption since they will be less likely to get stuck in the groove or rut in which they are seated due to the ovality or angularness of each groove. The successive engagement will be more apt to result in their rotation about a different set of axes so that the whole of the ball surface will be worked.

It has also been found for each of the embodiments that it is to be preferred if driving movement $M_N$ created by the elements N be larger than the resistance moment $M_R$ created by the frictional forces. In the embodiment shown in FIG. 1, this is easily accomplished since two elements N operate on the ball and the angle $\alpha$ can be chosen so that its magnitude creates this effect. In the embodiment of FIG. 2, this can easily be effected by controlling the pressure of the body R upward as well as the shear force applied by the element N.

In the embodiment of FIG. 3, on the other end, the driving element N must be chosen with regard to its specific coefficient of friction and its relative coefficient of friction with regard to the ball B, so that the inequality $M_N > M_R$. By simple mathematical calculation, it can be shown that if the distance K from the center of the ball to the surface of the rotating body is one-half of the radius of the ball (R/2), then the coefficient of friction $f_n$ between the ball and the drive element would be 55 percent larger than the coefficient of friction $f_r$ between the ball and the rotating body B. The distance K of course depends upon the widthwise radius and depth of groove G as well as the radius R of the ball.

The apparatus shown in FIG. 4 allows the method to be easily practiced with the use of a grinding abrasive since the resilient pad of high friction compensates for the lubricating action of the abrasive. The driving moment $M_N$ in this case is however dependent upon the dynamic viscosity of the abrasive emulsion as well as the relative dimensions of the ball and groove.

From the application of the above methods, results have been obtained which show an increased efficiency in grinding and machining and, in particular, balls which deviate excessively from a generally spherical shape. Raw bearing balls are especially angular and oval as seen in FIGS. 5 and 6 respectively, and before they can be uniformly ground about their entire surface, they must be converted to the general spherical shape, i.e., the high spots must first be removed. If the high spots are not removed, the ball is likely to continue rotating in the grinding operation about a non-spherical orbit wherein material is constantly removed from the wrong places.

The present method, allowing for the rotation about at least two axes, intermittent rotation, interrupted driving and controlled pressure and frictional contact, permits severely deviate balls to be ground quickly and to become more effectively machined in less time and with much less effort than had been obtained from the prior art methods. Reference to FIG. 7 shows the graphical comparison of bearing balls machined by the prior art methods, as seen in line $a$, and bearing balls machined by the present method, as seen in line $b$. When worked or machined by the prior art, the angularity or ovality is reduced in the first phase at relatively high speed, after which further accuracy is obtained very slowly. When the ball is worked by the method of the present invention, the time constant is substantially reduced and simultaneously the gained accuracy is expressly increased.

As has been seen, the present method may be carried out with many forms of apparatus. One such particular form is illustrated in FIG. 8 to which reference can now be made. The apparatus comprises a frame F in which is rotatably mounted a grinding disk 1 having a plurality of circular, oval or similar grinding grooves 2 each being a recess having a radius less than half the radius of the ball, in which the bearing balls are individually placed to be worked. The form of the grooves 2 and the structure to feed each with raw balls 3 may be provided with the usual, continuous cutting faces, abrasive materials, etc., that are common in this art. Since such features are well known to those skilled in this art, they are omitted here.

The circular disk 1 is separately mounted on a shaft 4 which is maintained for rotational and vertical movement in a pair of bearings formed in the frame F. A circular gear 5 is secured about the shaft 4 and meshes with a pinion gear 6 located at the end of the drive shaft of a reversible variable speed motor 7, preferably electric, which is also mounted to the frame. The electric motor 7 is provided with conventional control means for varying its speed and direction. As a result, the disk 1 may be made to rotate at selected speeds and in the desired direction about the axis X—X of the shaft 4.

Mounted at the bottom of the frame F in alignment with the shaft 4 is a fluid motor adapted to reciprocate the shaft 4 in a direction along its axis X—X. The fluid motor is a conventional hydraulic or pneumatic arrangement comprising a piston 8 and cylinder 9. The piston 8 extends upwardly into abutment with the lower terminal end of the shaft 4, which abutment is surrounded by suitable coupling means C which insures alignment of the shaft 4 and rod 8, while simultaneously insuring that it rotates and reciprocates along the vertical axis X—X on actuation by the piston 8 and the gear 5.

The lowermost end of the piston rod 8 extends outwardly of the cylinder 9 and below the lower portion of the frame F and is provided with an adjustable nut washer or other stop means 10. By adjusting the position of the stop means, the vertical ascent or rise of the rod 8 and, consequently, the disk 1 may be regulated.

The cylinder 9 is fed with a suitable working medium through a pressure regulating device 16 controlled by a suitable relay 17 which may be time actuated, automatically actuated or manually actuated as the situation requires or as is desired. The working medium is supplied and removed through input line 18 and output line 19.

Located above the disk 1 is an endless belt 11 of rugged flexible material such as steel, on the outer surface of which is secured a plurality of spaced resilient pads 12 formed of plastic, rubber or similar material in either sheet or foam form. The width of the belt 11 and the pads 12 is approximately equal to the diameter of the disk 1, within the belt 11. Located within the belt 11 and along the portion directly above the disk 1 is a pressure pad 13 of suitable hard rigid material. The pressure pad 13 may be spring biased, adjustably secured or even fixed to exert a desired degree of pressure on the under surface of the belt 11 as it passes over the disk 1.

The belt 11 is tensioned over a pair of spaced roller drums 14 mounted on vertical posts to the top frame F. One of the roller drums 14 is driven by a motor 15 through suitable pulley connections. The motor 15 may also be a variable speed, reversible electric motor provided with suitable controls which also interlock it to the aforementioned motor 7.

As a result of the operation of motor 15, the belt 11 may be endlessly moved in a linear direction perpendicular to the axis X—X, thereby causing the resilient pads 12 to intermittently pass over the disk 1. Simultaneously, the rotating disk may be raised by the piston 8 to place the balls 3 into contact with the pads 12. The rotation of the disk 1 and the linear movement of the belt 11 produce in the balls at least the two components of motion discussed earlier having axes of rotation relative to the grinding groove 2 and the resilient pads 12 which are angular to each other in such a manner that the balls rotate uniformly and continuously to effect an extremely efficient machining or working of the balls. By further varying either the speed at which disk 1 or belt 11 move, their direction, the linear extent of pads 12 or pressure applied either by raising the disk or lowering pressure pad 13, the components of motion may be varied and/or adjusted either prior to or during the working cycle.

In operation, the balls 3 are seated in the grooves on the disk 1 which is mounted on the shaft 4. The balls may be dusted with an abrasive material. The shaft 4 is raised to a predetermined position, defined either by the pressure in cylinder 9 or the limit stop 10, until the balls are suitably engaged by the resilient pads 12. For very raw balls, i.e., those having severe oval or triangular configuration, as seen in FIGS. 5 and 6, the initial contact with the pads 12 may be very light. Subsequently, after a good degree of spherical shape is obtained, the pressure may be increased. Both electric motors 7 and 15 are then activated, causing the balls to roll within their respective grooves 2. The rolling is caused only when the raw ball contacts the resilient pads 12, thereby grinding and lapping only the edges and points which require grinding.

By suitably combining the speed, direction, and pressure as indicated above, the arrangement and the component axes of rotation of the balls 3 may be regularly or selectively changed to achieve a uniform machining of the balls. Such combinations may be pre-programmed so that the speed change or reversal of direction, etc., are performed in regularly timed intervals. As a consequence, the present application may be simply adapted to perform the steps of the process and method hereinbefore described.

The same effect can be obtained by replacing the endless belt 11 with only a pressure pad 13 provided with resilient pads 12. The pressure pad may be mounted for linear or orbital movement on the end of a shaft or rod and provided with suitable drive means in well-known manner.

Another method by which the axes of rotation of the ball 3 can be changed is by periodically lowering the disk 1, while it is still rotating, so that the balls 3 lose complete contact with the resilient pads 12 while they change their angular position relative to the axis X—X. Thereafter, the disk 1 is raised, reengaging the balls 3 and pads 12. This additional reciprocation step may be performed at regular intervals. For example, the balls may be left in engagement with the moving pads 12 for a period $T_M$ during which the disk 1 is rotated through an angle relative to the axis X—X and the balls are rotated relative to the pads 12 and groove 2. Thereafter, the disk 1 is lowered for a time interval $T_O$ in which the two relative rotations are interrupted; however, during which the angular position relative to the axis X—X may be changed by an angle $\beta$. Thereafter, the disk is raised to effect the rotation of the balls again for a second time interval $T_{M1}$. This operation may be repeated cyclically as required.

The magnitude of the angular change $\beta$ in the angle $\alpha$ depends upon such factors as the nature of the abrasive, the speed of the belt 11 and other factors that it may vary anywhere between 0° and 360°. It is preferred that the magnitude of change $\beta$ be accomplished in increments equal to multiples of 90° (i.e., 180°, 270°, and 360°) since maximum effective change in the two noted axes of rotation can thus be effected. Similar optimum time intervals, speed, and reversals of direction can be worked out with the other forms of operating the machine.

Numerous variations of the method and many modifications and changes to both the method and apparatus have been described. Many additional modifications will be apparent to those skilled in this art. The present description is merely illustrative of the present invention and it should therefore not be taken as limiting in any sense.

I claim:

1. A method of machining bearing balls, comprising the steps of placing each ball in a grooved seat located on a first rotatable body, engaging said ball with a second movable body, rotating said first body about a fixed axis, driving said second body in a plane angular to said axis, creating a rolling of said ball within said grooved seat about a first axis of rotation and a second axis of rotation angular thereto as a result of the movement of resistance created by said grooved seat on said seated ball and the movement of drive created by the second body, and intermittently interrupting one of said movements created by one of said moving bodies to thereby vary the pattern of rotation of said ball.

2. The method according to claim 1, wherein the movement of said bodies is periodically varied in direction.

3. The method according to claim 1, wherein the movement of said bodies is periodically varied in speed.

4. The method according to claim 1, including the step of maintaining the ball resiliently between said bodies.

5. The method according to claim 1, wherein the coefficient of friction between the ball and the driving body is greater than the coefficient of friction between the ball and the rotating body.

6. The method according to claim 1, wherein the moment created by the driving body is greater than the moment created by the rotating body on the ball.

7. The method according to claim 1 wherein the center of said groove in which said ball seats is at a distance from the surface of the rotating body equal to less than half the length of the radius of the ball.

8. The method according to claim 1, including the step of providing the driving body with a resilient member for engaging the ball.

9. The method according to claim 8, wherein said resilient member comprises a plurality of spaced friction pads affording interrupted engagement of the ball.

* * * * *